US012700269B2

(12) United States Patent
Lüttenberg et al.

(10) Patent No.: US 12,700,269 B2
(45) Date of Patent: Aug. 4, 2026

(54) METHOD FOR OBTAINING INFORMATION ON THE STATUS OF A MOTOR VEHICLE DURING A PRODUCTION PROCESS OF THE MOTOR VEHICLE, AND MONITORING SYSTEM

(71) Applicant: Volkswagen Aktiengesellschaft, Wolfsburg (DE)

(72) Inventors: Christian Lüttenberg, Hattingen (DE); Lars Hanjürgens, Wallstawe OT Gieseritz (DE); Thorsten Ströher, Bischoffen (DE); Nils Karig, Meine (DE); Christian Burghoff, Braunschweig (DE); Jörg Elsner, Bottrop (DE); Marcel Kramer, Wasbüttel (DE); Andreas Benz, Hildesheim (DE); Konrad Brisse, Hattingen (DE); Martin Papproth, Haltern am See (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 398 days.

(21) Appl. No.: 18/572,904

(22) PCT Filed: Jun. 21, 2022

(86) PCT No.: PCT/EP2022/066877
§ 371 (c)(1),
(2) Date: Dec. 21, 2023

(87) PCT Pub. No.: WO2022/268809
PCT Pub. Date: Dec. 29, 2022

(65) Prior Publication Data
US 2024/0296701 A1 Sep. 5, 2024

(30) Foreign Application Priority Data
Jun. 21, 2021 (DE) ..................... 10 2021 206 347.0

(51) Int. Cl.
*G07C 5/08* (2006.01)

(52) U.S. Cl.
CPC ..................................... *G07C 5/08* (2013.01)

(58) Field of Classification Search
CPC .......... G07C 5/08; G07C 3/08; B62D 65/005; G05B 19/4183
See application file for complete search history.

(56) References Cited

FOREIGN PATENT DOCUMENTS

| | | | | |
|---|---|---|---|---|
| CN | 103679228 A | 3/2014 | ............. | G06K 17/00 |
| CN | 104076775 A | 10/2014 | ........... | G05B 19/418 |

(Continued)

OTHER PUBLICATIONS

English machine translation of Liu (CN-110745206-A) (Year: 2020).*
(Continued)

*Primary Examiner* — Walter L Lindsay, Jr.
*Assistant Examiner* — Geoffrey T Evans
(74) *Attorney, Agent, or Firm* — Slayden Grubert Beard PLLC

(57) ABSTRACT

The disclosure relates to a method for obtaining information on the status of a motor vehicle during a production process of the motor vehicle by means of a monitoring system, having the steps of: providing a motor vehicle blank during the production process, said motor vehicle blank having at least one required emergency call control apparatus; generating the information on the motor vehicle status by means of the emergency call control apparatus within the motor vehicle; and transmitting the information to the monitoring system by means of the emergency call control apparatus.

15 Claims, 2 Drawing Sheets

(56) References Cited

FOREIGN PATENT DOCUMENTS

| | | | | | |
|---|---|---|---|---|---|
| CN | 106325231 | A | | 1/2017 | G05B 19/418 |
| CN | 110745206 | A | * | 2/2020 | G08B 25/10 |
| CN | 112649210 | A | | 4/2021 | G01D 21/02 |
| DE | 10021733 | A1 | | 11/2001 | G07C 3/00 |
| DE | 102021206347 | A1 | | 12/2022 | B60R 16/02 |
| WO | WO-9728988 | A1 | * | 8/1997 | B60R 16/0315 |
| WO | 2022/268809 | A1 | | 12/2022 | G05B 19/418 |

OTHER PUBLICATIONS

International Search Report and Written Opinion, Application No. PCT/EP2022/066877, 16 pages, Sep. 28, 2022.
Chinese Office Action, Application No. 202280043620.6, 9 pages, Mar. 24, 2026.

* cited by examiner

METHOD FOR OBTAINING INFORMATION ON THE STATUS OF A MOTOR VEHICLE DURING A PRODUCTION PROCESS OF THE MOTOR VEHICLE, AND MONITORING SYSTEM

CROSS-REFERENCE TO RELATED APPLICATIONS

This application claims priority to German Patent Application No. 10 2021 206 347.0, filed on Jun. 21, 2021 with the German Patent and Trademark Office. The contents of the aforesaid patent application are incorporated herein for all purposes.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

The disclosure relates to a method for obtaining information on the status of a motor vehicle during a production process of the motor vehicle by means of a monitoring system. The disclosure additionally relates to a computer program product and a monitoring system.

It is known that a so-called motor vehicle blank, which is configured for example from the chassis with corresponding wheels, is created during the production process of a motor vehicle. Following this, corresponding instrument panels and further components can then be installed in turn. Following this, the motor vehicle to be produced is, in turn, further equipped in line with customers' individual wishes on the production line.

Currently, in particular after the motor vehicle blank has been provided, the motor vehicle blanks are monitored manually. In particular, the motor vehicle blanks are moved by human hands and monitored accordingly, which can lead to shortcomings since, in this case, human errors can occur and, in particular, corresponding information regarding the current motor vehicle status can be lost.

SUMMARY

A need exists to provide a method, a computer program product, as well as a monitoring system, by means of which the motor vehicle status can be better monitored during a production process of the motor vehicle.

The need is addressed by a method, a computer program product, as well as a monitoring system according to the independent claims. Embodiments are discussed in the dependent claims, the following description, and the drawings.

DESCRIPTION

Figure 1:
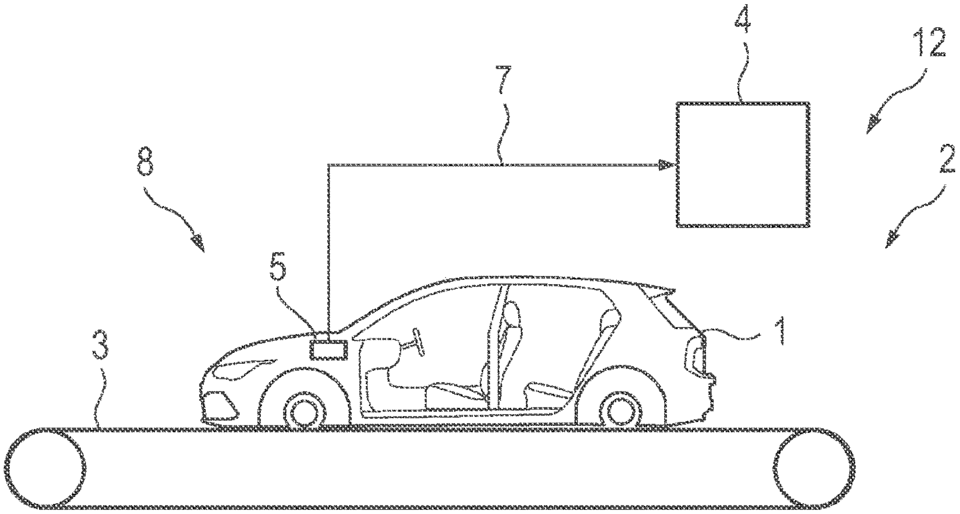
FIG. 1 shows a schematic side view of an embodiment of a motor vehicle blank.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Some embodiments relate to a method for obtaining information on the status of a motor vehicle during a production process of the motor vehicle by means of a monitoring system. A motor vehicle blank is provided during the production process, said motor vehicle blank having at least one emergency call control apparatus, in particular one required by law. The information on the motor vehicle status is generated by means of the emergency call control apparatus within the motor vehicle. The information is transmitted to the monitoring system by means of the emergency call control apparatus.

Consequently, the embodiments in particular utilize the emergency call control apparatus which can be required by law. The emergency call control apparatus can be provided to a user as a so-called e-emergency call, for example, following the delivery of the motor vehicle. In particular, the emergency call control apparatus already has a communication apparatus for making the emergency call as well as a localization apparatus, for example based on GNSS, a global positioning system (="Global Navigation Satellite System": GPS (Global Positioning System/America), BeiDuo (China), Glonass (Russia) and Galileo (Europe)) and can therefore already be deployed during the production process as well, in order to send corresponding information in the motor vehicle to the monitoring system during the production process. Consequently, manual monitoring of the motor vehicle status during the production process is no longer needed. Thus, the motor vehicle status can be fully monitored during the production process, as a result of which human errors are omitted.

In particular, a component which is already installed in the motor vehicle is consequently utilized in order to be able to call up and send the status of the motor vehicle during the production process. Consequently, expensive additional systems in order to nevertheless be able to reliably monitor the production process are no longer needed.

In particular, the emergency call controller, which can also be configured as an e-call controller, is consequently already switched on during the production process and can carry out the monitoring or, respectively the tracking of the motor vehicle in the production phase, consequently making it much easier. For example, corresponding sensors or detection apparatuses in the motor vehicle can automatically transmit a corresponding motor vehicle status in different situations throughout the factory and automatically transmit said motor vehicle status individually, for example, to the monitoring system via set triggers. Consequently, predefined storage areas having a corresponding complex and vulnerable infrastructure are dispensed with.

The emergency call control apparatus is required by law, for example in Europe. However, the emergency call control apparatus can also be used, in the event that this is not required by law, but is nevertheless installed in the motor vehicle, for example as optional equipment or as standard equipment.

In some embodiments, at least one item of position information of the motor vehicle is transmitted to the monitoring system during the production process as the information. In particular, this can be realized, for example, via the so-called GNSS. If, however, the motor vehicle is also traveling in areas where it cannot transmit a GNSS position, for example, alternative possibilities can also be realized in these situations, for example mobile radio-based positioning. Additionally, the method can also be provided in such a way that a predefined, so-called geofence is configured at specified positions and the motor vehicle or, respectively the emergency call control apparatus can react thereto. If, for example, it is not allowed or, respectively desired that corresponding information be sent in some regions, it is also possible that areas can be allowed in advance by way of feeding in so-called white-listed mobile country codes per destination data container and preventing the sending of the report in the restricted areas.

Furthermore, it is beneficial if the motor vehicle blank is at least provided as a movable motor vehicle blank. In particular, the motor vehicle blank can have at least the body as well as corresponding wheels in order to be moved. Following this, it is provided in the production process, for example, that the instrument panel is installed with the corresponding emergency call control apparatus. As of this point in time, the production process can be reliably monitored on the basis of the installed emergency call control apparatus. Following this, further production steps, in particular manufacturing the motor vehicle with the individual customers' wishes, can then be realized. Consequently, the production process can already be monitored at an early stage and with reduced outlay.

Likewise, it is beneficial if a plurality of vehicle states is detected within the motor vehicle during the production process and the plurality of vehicle states is transmitted to the monitoring system as the motor vehicle status. In particular, the plurality of vehicle states, for example which components have been installed up until that point, can be detected with corresponding sensors or detection apparatuses within the motor vehicle and this can then in turn be transmitted to the emergency call control apparatus and, as information or, respectively as the motor vehicle status, to the monitoring system. Consequently, the motor vehicle status in different construction sequences or, respectively during the progress of the motor vehicle's construction can already be reliably monitored during the production process.

Additionally, it has proven to be beneficial if information is transmitted to the monitoring system multiple times during the production process as a function of a production step. In particular, for example after specified production steps, for example after a specified motor vehicle component has been installed in the motor vehicle, corresponding information can be generated and transmitted the to monitoring system. Consequently, the motor vehicle status can be monitored in very great detail during the production process and, for example in the event of errors, it is already possible to intervene in the production process at an early stage so that time and outlay can be saved.

In some embodiments, the information is transmitted to the monitoring system multiple times based on events. In particular, so-called trigger conditions can be deployed, for example, in order to initiate the transmission of the information to the monitoring system. These triggers can, for example, be an engine start or, respectively an engine stop of the motor vehicle. Additionally, distance-based and/or time-based triggers can also be deployed. As a result, the corresponding vehicle status can be automatically transmitted to the monitoring system on the basis of different events.

In some embodiments, when a specified termination criterion is reached during the production process and/or following the production process, the generation of the information and/or the transmission of the information is/are terminated. For example, following the production process and before a so-called transport process begins, the corresponding termination criterion can be met and the generation of the information or, respectively transmission of the information can be terminated. In particular, it can be provided, for example, that the information is only transmitted with a first signature during the production process, wherein further information is then in turn generated during the transport process with a second signature which is different from the first signature, wherein the transport process, for example, can then also be monitored following the production process. In particular, the further information is likewise generated and transmitted with the emergency call control apparatus.

Furthermore, it has proven to be beneficial if the emergency call control apparatus is provided in such a way that the emergency call control apparatus is configured to make an electronic emergency call as a function of a user input in accordance with the termination criterion. For example, when the motor vehicle is received by the seller, a corresponding record can be made by the seller so that the motor vehicle is ready for delivery. If this record is then concluded, the information is no longer generated and transmitted to the monitoring system. In particular, the emergency call control apparatus is then exclusively configured to make the electronic emergency call as function of a user input. For example, the electronic emergency call can be actuated in the form of a button on the roof liner when it is pressed by the user during an accident. Additionally, different sensors can also automatically make an electronic emergency call in the motor vehicle during the accident. In particular, the electronic emergency call corresponds to the legal requirements which must be met, so that new motor vehicles can be permitted on the European market. According to some embodiments, it is now provided that before the electronic emergency call is "armed", the corresponding emergency call control apparatus is configured to carry out the monitoring during the production process.

The method presented is, in particular, a computer-implemented method. Further embodiments therefore relate to a computer program product having program code means which prompt an electronic computing apparatus, when the program code means are processed by the electronic computing apparatus, to carry out a method according to the preceding. Further embodiments therefore also relate to a computer-readable storage medium having the computer program product.

Additionally, the disclosure also relates to a monitoring system for obtaining information on the status of a motor vehicle during a production process of the motor vehicle, wherein the motor vehicle is configured to carry out a method according to the preceding. In particular, the method is carried out by means of the monitoring system.

The disclosure also includes developments of the monitoring system, which have features which have already been described in connection with the developments of the method. For this reason, the corresponding developments of the monitoring system are not described here again.

The disclosure also comprises the combinations of the features of the described embodiments.

Reference will now be made to the drawings in which the various elements of embodiments will be given numerical designations and in which further embodiments will be discussed.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

FIG. 1 shows a schematic side view of a motor vehicle blank 1 during a production process 2. In the present case, a motor vehicle 11 (FIG. 3) or, respectively the motor vehicle blank 1 is configured on a production line 3, which is intended to illustrate the production process 2.

In the present case, a monitoring system 4 is proposed, which is in particular provided by the factory. The motor vehicle blank 1 has at least one emergency call control apparatus 5 which is installed within the motor vehicle. In the present case, it is in particular provided that, for example, the emergency call control apparatus 5 is already installed in the motor vehicle blank 1, wherein the motor vehicle blank 1 is at least configured to be movable. For example, the motor vehicle blank 1 can have the body of the motor vehicle 11 and already the wheels of the motor vehicle 11. The emergency call control apparatus 5 can, for example, be configured in an instrument panel of the motor vehicle 11 or, respectively of the motor vehicle blank 1.

In other words, in the present case, the motor vehicle blank 1 is, in particular, at least provided as a movable motor vehicle blank 1. The emergency call control apparatus 5 is already installed in the motor vehicle blank 1, wherein in particular, following the installation of the emergency call control apparatus 5, for example, the further production of the motor vehicle 11 can be realized, which follows individual customer wishes. The emergency call control apparatus 5 is in particular provided in such a way that the emergency call control apparatus 5 is configured, in accordance with a termination criterion, to make an electronic emergency call, a so-called eCall, as a function of an input by a user 6 (FIG. 3) who can, in particular, be a purchaser of the motor vehicle 11.

Figure 2:
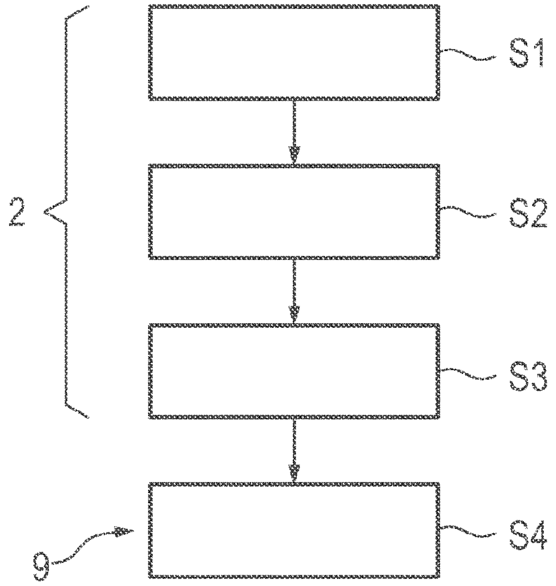
FIG. 2 shows a schematic flowchart of an embodiment of a method.
Figure 3:
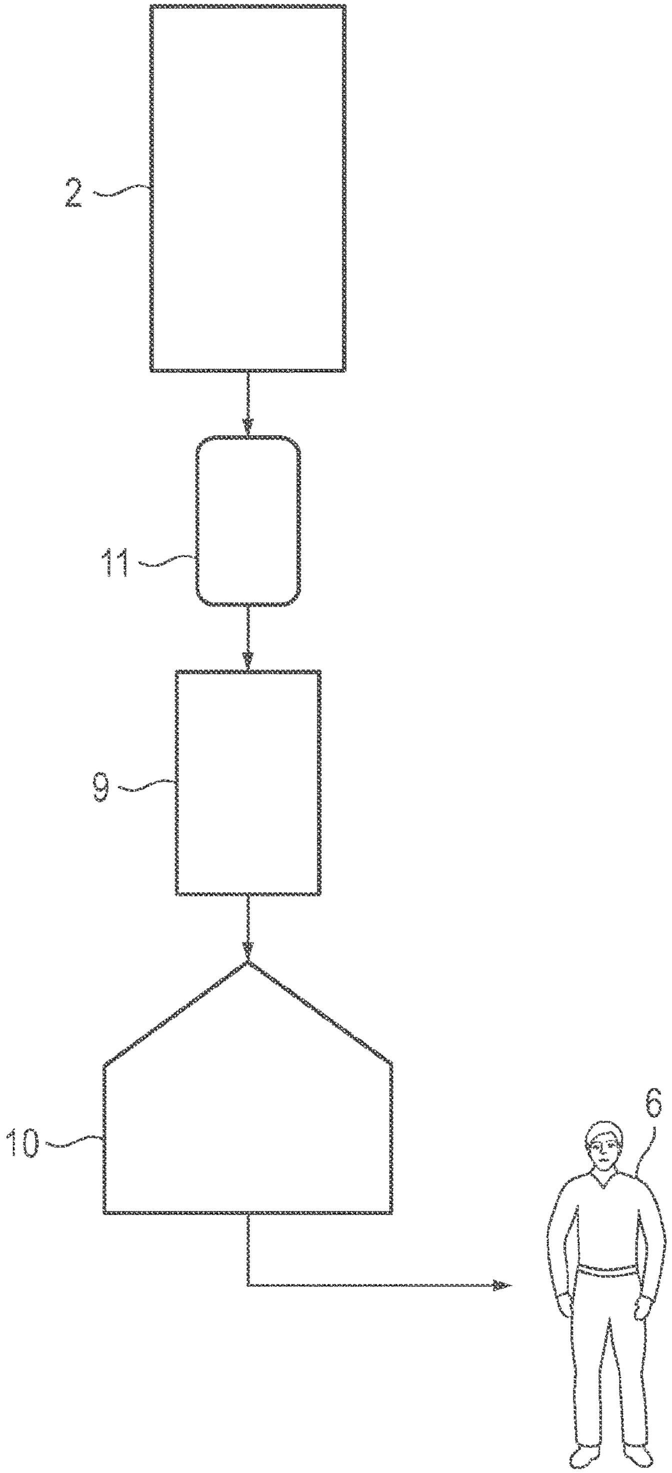
FIG. 3 shows a schematic top view of an embodiment of a production line for a production process.

FIG. 2 shows a schematic flowchart according to an embodiment of the method. In the case of the method for obtaining information 7 on the status 8 of a motor vehicle 11 during the production process 2 of the motor vehicle 11 by means of the monitoring system 4, the motor vehicle blank 1 is at least provided during the production process 2, said motor vehicle blank 1, as already described, having at least the emergency call control apparatus 5 required by law. In the present case, this is shown by the first step S1. In a second step S2 during the production process 2, the information 7 on the motor vehicle status 8 is generated by means of the emergency call control apparatus 5 within the motor vehicle. In a third step S3 during the production process 2, the information 7 is transmitted by means of the emergency call control apparatus 5 to the monitoring system 4. In particular, a fourth step S4 is shown below, wherein the fourth step S4 is already after the production process 2. For example, the fourth step S4 can describe a transport process 9. In other words, the motor vehicle blank 1 has now already been completed to form the motor vehicle 11 and is transferred to a transport process, for example to a delivery company 10 (FIG. 3). A termination criterion, for example the end of the production process 2, can be reached, for example, between the third step S3 and the fourth step S4, wherein it is then provided that the generation of the information 7 and/or the transmission of the information 7 is/are terminated. For example, it can be provided, during the transport process 9, that further information regarding the transport status is transmitted during the transport process 9. In particular, the information obtains a first signature and the second information obtains a second signature which is different from the first signature, such that the monitoring system 4 can recognize, based on the signatures, in which process the motor vehicle 11 is situated.

In particular, it can be provided that at least one item of position information of the motor vehicle 11 is transmitted to the monitoring system 4 during the production process 2, for example, as the information 7. Additionally, it can also be provided that a plurality of vehicle states is detected within the motor vehicle during the production process 2 and the plurality of vehicle states is transmitted to the monitoring system 4 as the motor vehicle status 8. Moreover, it can be provided that information 7 is transmitted to the monitoring system 4 multiple times during the production process 2 as a function of the progress of production. The information 7 can be transmitted to the monitoring system 4 multiple times based on events.

In particular, the teachings herein consequently utilize the fact that, due to the legal obligation for the so-called eCall, this emergency call control apparatus 5 can be utilized in order to be able to carry out a monitoring of the motor vehicle 11 or, respectively of the motor vehicle blank 1 during the production process 2 as well. Sensors in the motor vehicle blank 1 automatically recognize the respective vehicle states in all conceivable situations throughout the factory and transmit these automatically to the monitoring system 4 by individually set triggers or, respectively based on events. The data can then be sent, for example, via a mobile network to the monitoring system 4 which then forwards said data to the production and logistics backend. Consequently, it is no longer necessary to equip previously defined storage areas with a correspondingly complex and vulnerable infrastructure.

The method consequently offers the possibility of sending out data from the motor vehicle 11 or, respectively the motor vehicle blank 1 with in-vehicle means during the production process 2. For example, it can be provided that, while the motor vehicle 11 or, respectively the motor vehicle blank 1 is situated in the production mode, a corresponding trigger condition is actuated. This trigger condition can be, for example, an engine start, wherein the production mode then has to be switched on and, for example, a speed of greater than 1 km/h is recorded. In particular, the motor vehicle 11 or, respectively the motor vehicle blank 1 is consequently already moving independently. An engine stop can, for example, follow as the next trigger, which means that the motor vehicle 11 or, respectively the motor vehicle blank 1 has been moved. This can be realized, for example, as a result of the production mode being on, however the readiness to drive, in particular, the engine stop, is set to zero. Furthermore, it can be provided that, while the motor vehicle 11 or, respectively the motor vehicle blank 1 is moved, a so-called “trace” is left on a corresponding map at time-related or distance-related intervals. In particular situations, it would consequently be possible to track motor vehicles 11 or, respectively motor vehicle blanks 1 in more detail if the motor vehicle 11 or, respectively the motor vehicle blank 1 is traveling in production mode.

If, for example, the motor vehicle blank 1 or, respectively the motor vehicle 11 is traveling in areas where it cannot establish a navigation position, for example a GNSS position, an alternative possibility for transmitting the position can be realized using mobile radio-based positioning by means of the emergency call control apparatus 5. Furthermore, it can be provided that it is possible to react to the specific positions and a defined geofence, and that this can also be additionally triggered by this logic.

Thanks to the transmission of the signature, the recipient of the information 7 is able to draw conclusions about missing vehicle states.

Additionally, it can be provided that it is not allowed or, respectively desired that the corresponding information 7 be sent in some regions, a corresponding application can likewise offer the possibility of allowing areas in advance by way of feeding in so-called white-listed ("allowed") mobile country codes per destination data container and preventing the sending of reports in the restricted areas.

In the event that no information 7 is to be generated, the motor vehicle status 8 can be sent or not sent via SMS ("short message service"), wherein these trigger conditions can be activated or, respectively deactivated by production. This case can be realized, for example, for so-called direct runners, wherein these are motor vehicles 11 or, respectively motor vehicle blanks 1 within production, wherein the motor vehicles 11 or, respectively the motor vehicle blanks 1 do not require any additional maintenance or repair.

In particular, the motor vehicle identification number (VIN), as well as a continuous signature of this report to be sent can be transmitted, for example, as information 7. Additionally, the state can also be transmitted via the production mode and the trigger reason. A total number of kilometers traveled and a battery voltage as well as the state of charge (SOC) can also be transmitted. Additionally, a time stamp as well as position information, for example the geometric latitude, longitude, altitude as well as position accuracy, can also be transmitted. Alternatively, if it is not possible, for example, to transmit an exact position via GNSS, the mobile radio location can also be transmitted. Additionally, the Mobile Country Code (MCC), Mobile Network Code (MNC) as well as the Cell ID and the Radio Signal Strength Indication (RSSI) can also be transmitted.

These triggers relate to the time when the motor vehicle 11 or, respectively the motor vehicle blank 1 is in so-called generator operation, that is to say is ready to drive (driving operation). The motor vehicle 11 can trigger in production mode if, for example, an engine start or, respectively engine stop has been recognized, as well as in the time therebetween or, respectively also based on distance. These defined triggers can also be individually uploaded to the respective motor vehicle 11 or, respectively the motor vehicle blank 1 in production.

FIG. 3 shows a schematic flowchart according to an entire chain of action for delivering the motor vehicle 11. In the present case, the production process 2 as well as the transport process 9, in particular, are shown. The motor vehicle 11 is completed following the production process 2 and can be handed over to a delivery company 10 in the transport process 9. Following this, the delivery company 10 in turn delivers the completed motor vehicle 11 to the user 6. In this case, it can for example be provided that the compulsory commissioning of the mandatory eCall for the user 6 is carried out by the delivery company 10, wherein, following this, this can in turn be considered to be a termination criterion such that the transmission of the information 7 or, respectively the generation of the information 7 is suppressed as of this point in time. It can additionally be provided that, at the latest as of this point in time, the generation of the information 7 and the transmission of the information 7 are also suppressed automatically, that is to say without the intervention of the delivery company 10, for example after a corresponding activation of the motor vehicle 11 by the user 6. Consequently, the possibility of the user 6 being further tracked or, respectively kept track of is excluded.

In particular, the teachings herein consequently offer the benefits that no additional costs are incurred in the completion of the vehicle, since it is mandatory that the emergency call control apparatus 5 is installed in the motor vehicle 11. It can lead to a reduction of costs in the delivery process within the logistics chain since existing tracking systems no longer have to be operated. Efficient vehicle localization can additionally be realized, both in terms of time and in terms of the personnel involved in the process. The entire logistics chain can additionally be digitized, which leads to a streamlining of the delivery process. The monitoring system 4 can be deployed universally and can also be designed as an expandable online service, for example. Additionally, this can be deployed worldwide. Additionally, it is also possible to calculate import and export duties, for example, on the basis of the information 7 which can in particular have position data as well as the vehicle status and further information 7, which leads to a simplification of the delivery process. The motor vehicles 11 can additionally be located around the world, which means that there is no need for manual, automatic scanning processes. The localization of the motor vehicles 11 additionally leads to a reduction in vehicle thefts. Moreover, the vehicle state, for example a voltage of the corresponding battery in the motor vehicle 11, can be monitored, which leads to compliance with quality requirements. The ability to retrieve lost motor vehicles 11 is additionally improved. Moreover, measures for the early reduction of reworking can also be included in the production process 2.

FIG. 2 additionally shows a schematic flowchart according to a further embodiment of the method. In the case of the method for obtaining information 7 on the status 8 of a motor vehicle 11 during the transport process 9 of the motor vehicle 11 by means of the monitoring system 5, the motor vehicle 11 is at least provided, wherein the motor vehicle 11, as already described, has at least the emergency call control apparatus 5 required by law. During the transport process 9 the information 7 on the motor vehicle status 8 is generated by means of the emergency call control apparatus 5 within the motor vehicle. During the transport process 9, the information 7 is transmitted to the monitoring system 4 by means of the emergency call control apparatus 5. For example, a transfer process to a delivery company 10 for the motor vehicle 11 can then be carried out. For example, the motor vehicle 11 can be delivered to the user 6. Additionally, a termination criterion can be reached, for example the end of the transport process 9, wherein it is then provided that the generation of the information 7 and/or the transmission of the information 7 is/are terminated. For example, it can be provided that, during the production process 2, further information regarding the production status during the production process 2 is transmitted. In particular, the information 7 obtains a first signature and the second or, respectively further information has a second signature which is different from the first signature, such that the monitoring system 4 can recognize, based on the signatures, in which process the motor vehicle 11 is situated.

In particular, it can be provided that at least one item of position information of the motor vehicle 11 is transmitted to the monitoring system 4 during the transport process 9, for example, as the information 7. Additionally, it can also be provided that a plurality of vehicle states is detected within the motor vehicle during the transport process 9 and the plurality of vehicle states is transmitted to the monitoring system 4 as the motor vehicle status 8. Moreover, it can be provided that information 7 is transmitted to the monitoring system 4 multiple times during the transport process 9 as a function of the progress of the transport. The information 7 can be transmitted to the monitoring system 4 multiple times based on events.

In particular, this embodiment consequently utilizes the fact that, due to the legal obligation for the so-called eCall, this emergency call control apparatus 5 can be utilized in order to be able to carry out a monitoring of the motor vehicle 11 during the transport process 9 as well. Sensors in the motor vehicle 11 automatically recognize respective vehicle states in all conceivable situations worldwide and transmit these automatically to the monitoring system 4 by individually set triggers or, respectively based on events. The data can then be sent, for example, via a mobile network to the monitoring system 4 which then forwards said data to the production and logistics backend. Consequently, it is no longer necessary to equip previously defined storage areas with a correspondingly complex and vulnerable infrastructure.

The method consequently offers the possibility of sending out data from the motor vehicle 11 with in-vehicle means during the transport process 9. For example, it can be provided that, while the motor vehicle 11 is situated in transport mode, a corresponding trigger condition is actuated. This trigger condition can be, for example, an engine start, wherein the transport mode then has to be switched on and, for example, a speed of greater than 1 km/h is recorded. In particular, the motor vehicle 11 is consequently already moving independently. An engine stop can, for example, follow as the next trigger, which means that the motor vehicle 11 has been moved. This can be realized, for example, as a result of the transport mode being on, however the readiness to drive, in particular, the engine stop, is set to zero. Furthermore, it can be provided that, while the motor vehicle 11 is moved, a so-called "trace" is left on a corresponding map at time-related or distance-related intervals. In particular situations, it would consequently be possible to track motor vehicles 11 in more detail if the motor vehicle 11 is traveling in transport mode.

If, for example, the motor vehicle 11 is traveling in areas where it cannot establish a navigation position, for example a GNSS position, an alternative possibility for transmitting the position can be realized using mobile radio-based positioning by means of the emergency call control apparatus 5. Furthermore, it can be provided that it is possible to react to the specific positions and a defined geofence, and that this can also be additionally triggered by this logic.

Thanks to the transmission of the signature, the recipient of the information 7 is able to draw conclusions about missing vehicle states.

Additionally, it can be provided that it is not allowed or, respectively desired that the corresponding information 7 be sent in some regions, a corresponding application can likewise offer the possibility of allowing areas in advance by way of feeding in so-called white-listed mobile country codes per destination data container and preventing the sending of reports in the restricted areas.

In the event that no information 7 is to be generated, the motor vehicle status can be sent or not sent via SMS ("short message service"), wherein these trigger conditions can be activated or, respectively deactivated by production. This case can be realized, for example, for so-called direct runners, wherein these are motor vehicles 11 within production, or, respectively within transport, wherein the motor vehicles 11 do not need any additional maintenance or repair.

In particular, the motor vehicle identification number (VIN), as well as a continuous signature of this report to be sent can be transmitted, for example, as information 7. Additionally, the state can also be transmitted via the transport mode and the trigger reason. A total number of kilometers traveled and a battery voltage as well as the state of charge (SOC) can also be transmitted. Additionally, a time stamp as well as position information, for example the geometric latitude, longitude, altitude as well as position accuracy, can also be transmitted. Alternatively, if it is not possible, for example, to transmit an exact position via GNSS, the mobile radio location can also be transmitted. Additionally, the Mobile Country Code (MCC), Mobile Network Code (MNC) as well as the Cell ID and the Radio Signal Strength Indication (RSSI) can also be transmitted.

These triggers relate to the time when the motor vehicle 11 is in so-called generator operation, that is to say is ready to drive (driving operation). The motor vehicle 11 can trigger in transport mode if, for example, an engine start or, respectively engine stop has been recognized, as well as in the time therebetween or, respectively also based on distance. These defined triggers can also be individually uploaded to the respective motor vehicle 11 in production.

If the vehicle is moved (transported) abroad and it is then moved off the ship again, for example, the monitoring system 5 tries to send the new position of the motor vehicle 11. Consequently, during loading and also during unloading, these changes in position of the motor vehicle 11 are detected and the current motor vehicle status 8 is transmitted.

For example, the emergency call control apparatus 5 can additionally position itself based on GNSS when the engine is started for the first time. However, since, for example, the last position (previous engine stop) does not match this, the position of the motor vehicle 11 has to be redetermined on the basis of the GNSS system. This process can take a certain amount of time. If this engine operating cycle is too short for this, recourse is alternatively had to a cell-based position determination with the locally available mobile network operator (MNO). Consequently, the deactivation of the transport mode and the transfer of ownership can be recorded digitally.

Alternatively, FIG. 3 shows a schematic flowchart according to an entire chain of action for delivering the motor vehicle 11. In the present case, the production process 2 as well as the transport process 9, in particular, are shown. The motor vehicle 11 is completed following the production process 2 and can be handed over to a delivery company 10 in the transport process 9. Following this, the delivery company 10 in turn delivers the completed motor vehicle 11 to the user 6. In this case, it can for example be provided that the compulsory commissioning of the mandatory eCall for the user 6 is carried out by the delivery company 10, wherein, following this, this can in turn be considered to be a termination criterion such that the transmission of the information 7 or, respectively the generation of the information 7 is suppressed as of this point in time. It can additionally be provided that, at the latest as of this point in time, the generation of the information 7 and the transmission of the information 7 are also suppressed automatically, that is to say without the intervention of the delivery company 10, example for after a corresponding activation of the motor vehicle 11 by the user 6. Consequently, the possibility of the user 6 being further tracked or, respectively kept track of is excluded.

In particular, this embodiment consequently offers the benefits that no additional costs are incurred in the completion of the vehicle and the transport, since it is mandatory that the emergency call control apparatus 5 is installed in the motor vehicle 11. It can lead to a reduction of costs in the delivery process within the logistics chain since existing tracking systems no longer have to be operated. Efficient vehicle localization can additionally be realized, both in terms of time and in terms of the personnel involved in the process. The entire logistics chain can additionally be digitized, which leads to a streamlining of the delivery process. The monitoring system 4 can be deployed universally and can also be designed as an expandable online service, for example. Additionally, this can be deployed worldwide. Additionally, it is also possible to calculate import and export duties, for example, on the basis of the information 7 which can in particular have position data as well as the vehicle status and further information 7, which leads to a simplification of the delivery process. The motor vehicles 11 can additionally be located around the world, which means that there is no need for manual, automatic scanning processes. The localization of the motor vehicles 11 additionally leads to a reduction in vehicle thefts. Moreover, the vehicle state, for example a voltage of the corresponding battery in the motor vehicle 11, can be monitored, which leads to compliance with quality requirements. It is additionally possible to retrieve lost motor vehicles 11. Moreover, measures for the early reduction of reworking can also be included in the transport process 9.

LIST OF REFERENCE NUMERALS

- 1 Motor vehicle blank
- 2 Production process
- 3 Production line
- 4 Monitoring system
- 5 Emergency call control apparatus
- 6 User
- 7 Information
- 8 Motor vehicle status
- 9 Transport process
- 10 Delivery company
- 11 Motor vehicle
- S1 First step
- S2 Second step
- S3 Third step
- S4 Fourth step The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for obtaining production information comprising a status of a motor vehicle during a production process of the motor vehicle using a monitoring system, comprising:

providing a motor vehicle blank during the production process, said motor vehicle blank having at least one emergency call control system;

initializing the emergency call control system for transmitting the production information;

repeatedly generating the production information using the emergency call control system within the motor vehicle; and repeatedly transmitting the production information to the monitoring system using the emergency call control system of the motor vehicle;

determining, if a specified termination criterion is reached during or after the production process, and when the specified termination criterion is reached, selectively terminating one or more of the generation of the information and the transmission of the information, and reconfiguring the emergency call control system for making electronic emergency calls as a function of a user input.

2. The method of claim 1, wherein at least one item of position information of the motor vehicle is transmitted to the monitoring system during the production process as the production information.

3. The method of claim 2, wherein the motor vehicle blank is at least provided as a movable motor vehicle blank.

4. The method of claim 2, wherein a plurality of vehicle states is detected within the motor vehicle during the production process and the plurality of vehicle states is transmitted to the monitoring system as the motor vehicle status.

5. The method of claim 2, wherein production information is transmitted to the monitoring system multiple times during the production process as a function of the progress of production.

6. The method of claim 1, wherein the motor vehicle blank is at least provided as a movable motor vehicle blank.

7. The method of claim 6, wherein a plurality of vehicle states is detected within the motor vehicle during the production process and the plurality of vehicle states is transmitted to the monitoring system as the motor vehicle status.

8. The method of claim 6, wherein production information is transmitted to the monitoring system multiple times during the production process as a function of the progress of production.

9. The method of claim 1, wherein a plurality of vehicle states is detected within the motor vehicle during the production process and the plurality of vehicle states is transmitted to the monitoring system as the motor vehicle status.

10. The method of claim 9, wherein production information is transmitted to the monitoring system multiple times during the production process as a function of the progress of production.

11. The method of claim 1, wherein production information is transmitted to the monitoring system multiple times during the production process as a function of the progress of production.

12. The method of claim 11, wherein the production information is transmitted to the monitoring system multiple times based on events.

13. The method of claim 1, wherein the emergency call control system is a required emergency call control system.

14. A non-transitory medium comprising program code which prompt an electronic computing apparatus, when the program code is processed by the electronic computing apparatus, to:

initialize an emergency call control system of a vehicle for transmitting production information comprising vehicle status information;

repeatedly generating the production information using the emergency call control system within the motor vehicle;

repeatedly transmitting the production information to a monitoring system using the emergency call control system of the motor vehicle;

determining if a specified termination criterion is reached during or after the production process; and when the specified termination criterion is reached, selectively terminating one or more of the generation of the information and the transmission of the information, and reconfiguring the emergency call control system for making electronic emergency calls as a function of a user input.

15. A monitoring system for obtaining production information comprising a status of a motor vehicle during a production process of the motor vehicle, having at least one electronic computing system, wherein the monitoring system is configured to:

initialize an emergency call control system for transmitting the production information;

repeatedly generate the production information using the emergency call control system within the motor vehicle;

repeatedly transmit the production information to the monitoring system using the emergency call control system of the motor vehicle;

determine, if a specified termination criterion is reached during or after the production process; and when the specified termination criterion is reached selectively terminate one or more of the generation of the information and the transmission of the information, and reconfigure the emergency call control system for making electronic emergency calls as a function of a user input.

* * * * *